US005084814A

United States Patent [19]

Vaglica et al.

[11] Patent Number: 5,084,814

[45] Date of Patent: Jan. 28, 1992

[54] DATA PROCESSOR WITH DEVELOPMENT SUPPORT FEATURES

[75] Inventors: John J. Vaglica; Jay A. Hartvigsen, both of Austin, Tex.; Rand L. Gray, Hillsboro, Oreg.

[73] Assignee: Motorola, Inc., Schaumburg, Ill.

[21] Appl. No.: 115,479

[22] Filed: Oct. 30, 1987

[51] Int. Cl.[5] .......................... G06F 15/78; G06F 9/00

[52] U.S. Cl. ................................ 395/325; 364/232.9; 364/232.8; 364/232.3; 364/267; 364/267.91; 364/DIG. 1; 371/16.1; 371/19

[58] Field of Search ... 364/200 MS File, 900 MS File; 371/16-20, 15

[56] References Cited

U.S. PATENT DOCUMENTS

| | | | |
|---|---|---|---|
| 4,153,933 | 5/1979 | Blune, Jr. et al. | 364/200 |
| 4,231,087 | 10/1980 | Hunsberger et al. | 364/200 |
| 4,296,469 | 10/1981 | Gunter et al. | 364/200 |
| 4,307,445 | 12/1981 | Tredennick et al. | 364/200 |
| 4,312,066 | 1/1982 | Bantz et al. | 371/16 |
| 4,338,660 | 7/1982 | Kelley et al. | 364/200 |
| 4,342,078 | 7/1982 | Tredennick et al. | 364/200 |
| 4,399,870 | 9/1982 | Shaw et al. | 364/200 |
| 4,441,154 | 4/1984 | McDonough et al. | 364/200 |
| 4,486,827 | 12/1984 | Shima et al. | 364/200 |
| 4,524,415 | 6/1985 | Mills, Jr. et al. | 364/200 |
| 4,667,285 | 5/1987 | Suzuki et al. | 364/200 |
| 4,670,838 | 6/1987 | Kawata | 364/200 |
| 4,674,089 | 6/1987 | Poret et al. | 371/25 |
| 4,677,586 | 6/1987 | Magar et al. | 364/900 |
| 4,698,750 | 10/1987 | Wilkie et al. | 364/200 |
| 4,700,293 | 10/1987 | Grone | 364/200 |
| 4,710,927 | 12/1987 | Miller | 371/15 |
| 4,740,882 | 4/1988 | Miller | 364/200 X |

FOREIGN PATENT DOCUMENTS

| | | | |
|---|---|---|---|
| 0129559 | 8/1983 | Japan | 371/19 |

OTHER PUBLICATIONS

Motorola Inc., "16/32-BIT Microcomputer System Components", pp. 1-16 to 1-34, 1985.

Article entitled, "Embedded Bliss for Emulation", by Huffman et al., appearing in Electronic Products, pp. 20-21 on Feb. 1, 1987.

*Primary Examiner*—Gareth D. Shaw
*Assistant Examiner*—Paul Kulik
*Attorney, Agent, or Firm*—Jonathan P. Meyer

[57] ABSTRACT

A data processor with development support features includes an alternate mode of operation in which instructions are received by means of an externally-controlled path. The connections used by the externally-controlled path are not shared by any system resources accessible to the data processor in the normal mode of operation, but are used by other development support features in the normal mode. In a preferred embodiment, an integrated circuit microcomputer includes such a data processor as its CPU. The CPU has access to on-chip peripherals and memory, in addition to off-chip peripherals and memory, in both the normal and alternate modes of operation, by means of a parallel bus which it operates as a bus master. In the alternate mode, the CPU receives instructions by means of a serial bus on which the CPU is a slave device.

30 Claims, 3 Drawing Sheets

SERIAL I/O PINS
10
SERIAL INTERFACE
13
14
MEMORY
IPIPE/DSO
IFETCH/DSI
BKPT/DSCLK
CPU
11
15
TIMER
TIMER PINS
IMB
12
16
SIM
EXTERNAL BUS PINS

54
MICROCODE
SEQUENCER
53
IPIPE/ DSO
IFETCH/ DSI
51
IR PIPE
55
SERIAL INTERFACE
50
DATA
BKPT/ DSCLK
BUS CONTROLLER
ADDRESS
52
EXECUTION UNIT

FIG. 2
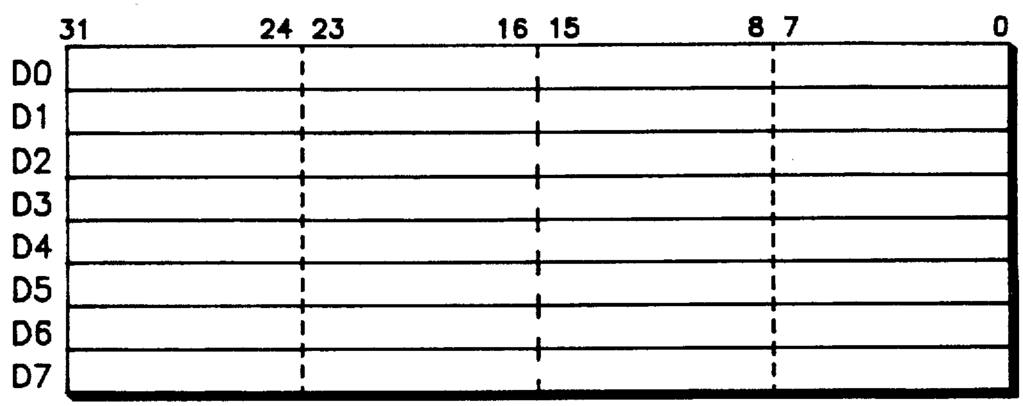
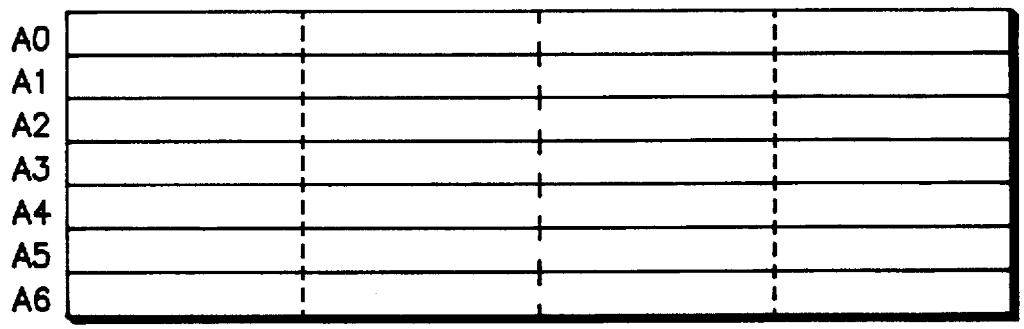
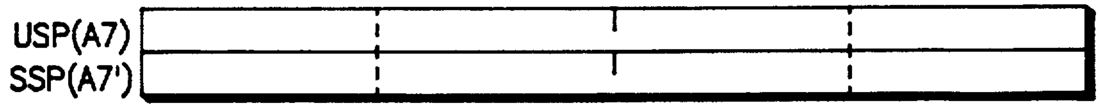
PC
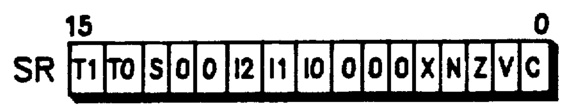
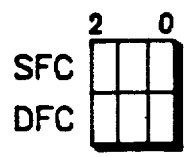
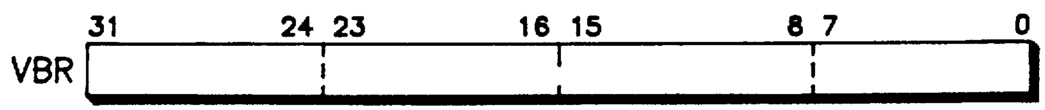

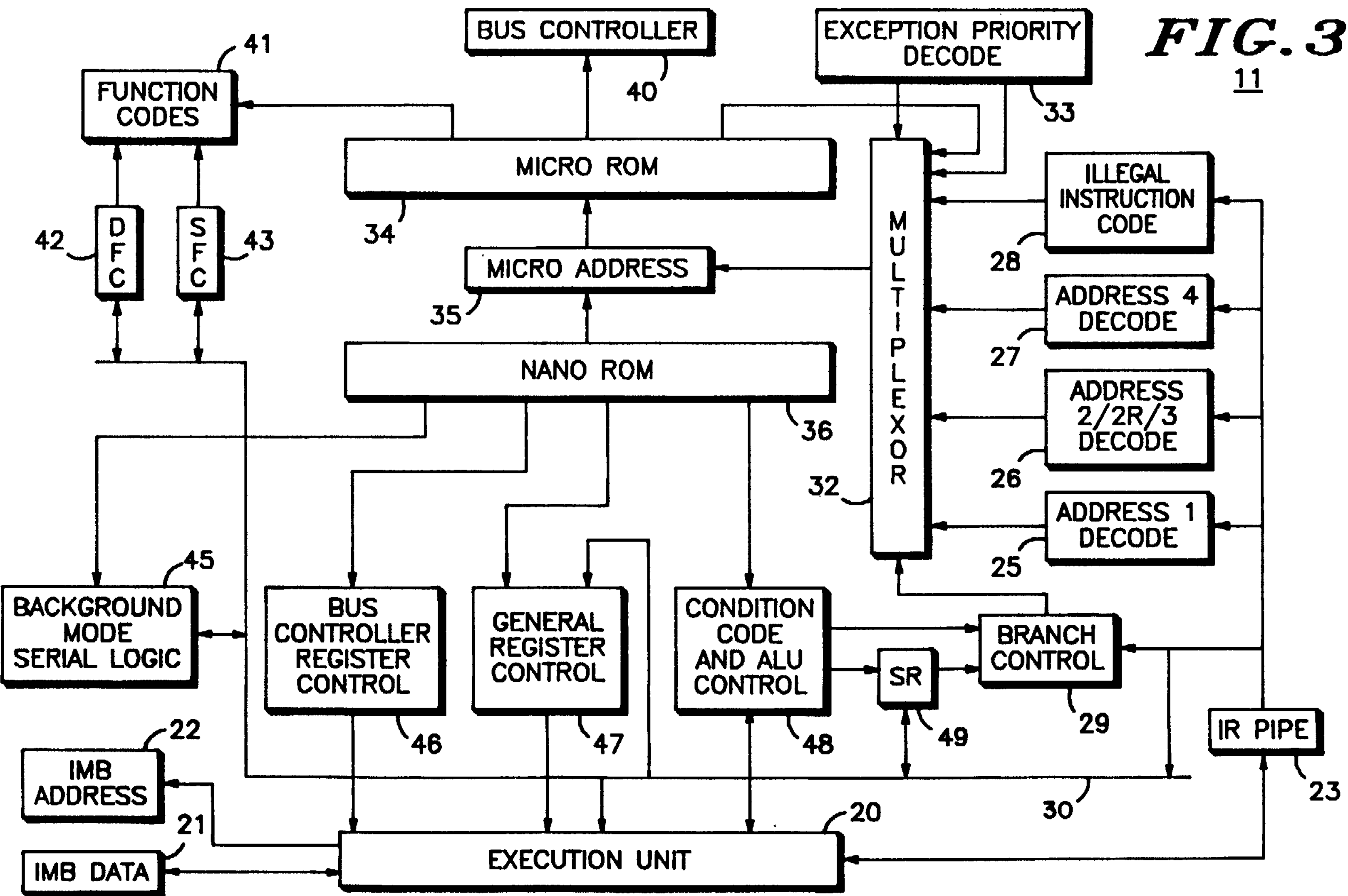
FIG. 3
11
BUS CONTROLLER
EXCEPTION PRIORITY DECODE
FUNCTION CODES
MICRO ROM
MULTIPLEXOR
ILLEGAL INSTRUCTION CODE
DFC
SFC
MICRO ADDRESS
ADDRESS 4 DECODE
NANO ROM
ADDRESS 2/2R/3 DECODE
ADDRESS 1 DECODE
BACKGROUND MODE SERIAL LOGIC
BUS CONTROLLER REGISTER CONTROL
GENERAL REGISTER CONTROL
CONDITION CODE AND ALU CONTROL
SR
BRANCH CONTROL
IR PIPE
IMB ADDRESS
IMB DATA
EXECUTION UNIT
20
21
22
23
25
26
27
28
29
30
32
33
34
35
36
40
41
42
43
45
46
47
48
49

DATA PROCESSOR WITH DEVELOPMENT SUPPORT FEATURES

FIELD OF THE INVENTION

The present invention relates, in general, to a data processor having features which enhance the functionality and reduce the complexity of development systems intended for use with the system. More particularly, the invention relates to a data processor with a debug mode of operation in which instructions are received by means of a serial interface.

BACKGROUND OF THE INVENTION

Development systems are used in conjunction with data processing systems to assist in the "debugging" of both hardware and software. Typical functions of development systems include the insertion of and response to breakpoints, halting the execution of the data processor to examine and perhaps alter the contents of various system registers and the like and tracing the execution of software.

Data processing systems which are constructed as single integrated circuits, or even as a combination of a few such integrated circuits, present increasingly difficult problems in the design of development systems. As the complexity of the data processor increases, more and more functionality is incorporated onto a single integrated circuit and less access to internal buses, registers and the like is available to development systems.

Prior art integrated circuit data processing systems are known in which a special operating mode is available for debugging and/or emulation purposes. In the special operating mode, the system executes normal instructions as in the normal mode, but fetches the instructions to be executed from a location external to the integrated circuit. In all such systems, one or more of the "system resources" which are utilized by the system in its normal mode of operation (e.g. a communication port) are appropriated for communication with the development system during the special operating mode.

Other development support features which appear in prior art integrated circuit data processing systems include the ability to halt the processor and read certain internal registers and the ability to operate a separate, specially-provided state machine on the same integrated circuit to perform certain debugging functions.

All of the prior art data processing systems with development support features have one or more disadvantages. For instance, the appropriation of system resources for use in the debug mode prevents those resources from being used in their normal fashion, thus requiring extra peripheral circuitry to emulate those functions. The provision of an extra, on-chip debugging machine requires significant extra area on the integrated circuit and is, therefore, suitable only for use on limited numbers of special purpose, debugging-type data processors.

SUMMARY OF THE INVENTION

Accordingly, it is an object of the present invention to provide an improved data processor with development support features.

It is a further object of the present invention to provide a data processor having an alternate mode of operation in which the normal instruction execution apparatus of the processor is used to execute debugging instructions.

It is yet a further object of the present invention to provide a data processor having an alternate mode of operation in which debugging instructions are received for execution by means of a serial communication interface which is not one of the system resources available to the system in the normal mode of operation.

These and other objects and advantages of the present invention are provided by a data processor having a plurality of system resources and comprising: first means for executing instructions; second means for utilizing the system resources in accordance with the execution by said first means of a first plurality of instructions; and third means for providing access to at least one of the system resources in accordance with the execution by said first means of a second plurality of instructions.

These and other objects and advantages of the present invention will be apparent to those skilled in the art from the detailed description below taken together with the drawings.

BRIEF DESCRIPTION OF THE DRAWINGS

FIG. 2 is a diagram illustrating the programmer's model of the data processor of FIG. 1;

FIG. 3 is a diagram illustrating the structure of portions of the central processing unit of the data processing system of FIG. 1.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Figure 1:
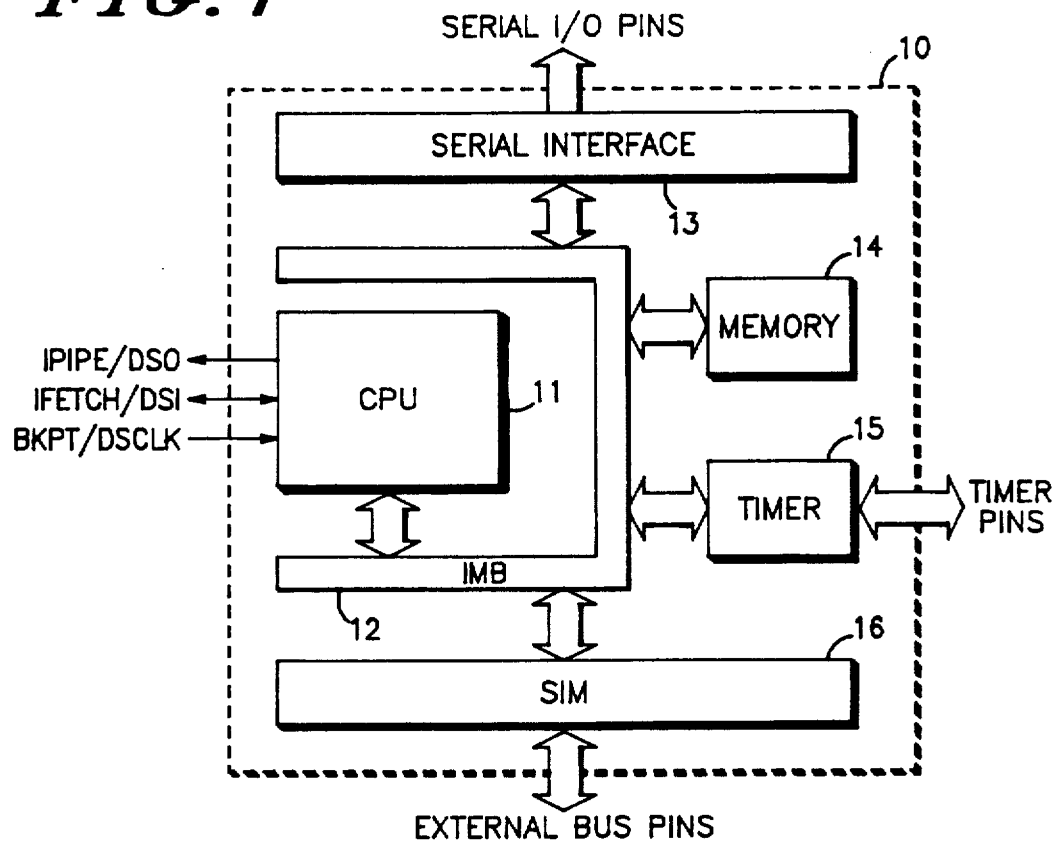
FIG. 1 is a block diagram of an integrated circuit data processing system which comprises a preferred embodiment of the present invention.

FIG. 1 illustrates an integrated circuit data processing system according to a preferred embodiment of the present invention. A microcomputer 10 comprises a central processing unit (CPU) 11, an inter-module bus (IMB) 12, a serial communication interface 13, on-board memory 14, a timer module 15 and a system integration module (SIM) 16. Inter-module bus 12, which comprises multiple data, address and control signal lines as described in detail below, is coupled to and provides for communication between each of the other components of microcomputer 10. Serial interface 13 provides for synchronous and/or asynchronous serial data transfer between microcomputer 10 and external devices and systems by means of several serial I/O pins. Memory 14 provides storage space for program and other data useful to microcomputer 10. Timer module 15 provides various timing functions such as input capture, output compare and the like by means of several timer pins. SIM 16 provides an interface between IMB 12 and an external bus, the details of which are discussed below, and also provides certain system functions such as clock signal generation and distribution.

In addition to its connection to IMB 12, CPU 11 is coupled to three pins of microcomputer 10 which are referred to by the labels IPIPE/DSO, IFETCH/DSI and BKPT/DSCLK, respectively. IPIPE/DSO is an output-only pin which provides a signal useful to an external development system for instruction pipeline synchronization (IPIPE) or debug serial communication (DSO), depending on the operating mode of CPU 11. IFETCH/DSI is a bidirectional pin which is useful to an external development system for instruction pipeline synchronization (IFETCH) or debug serial communication (DSI), depending on the operating mode of CPU 11. BKPT/DSCLK is an input-only pin which is useful to an external development system for directing CPU 11 to execute a breakpoint (BKPT), to enter a debug mode of operation or for debug serial communication (DSCLK), depending on the operating mode of CPU 11. Each of these functions is described in more detail below.

While not all of the development support features of microcomputer 10 are the subject of the present invention, all are inter-related in the context of the operation of the preferred embodiment. The development support features of microcomputer 10 include: a "background debug" mode of operation, trackability of the instruction pipeline of CPU 11, external visibility of IMB bus cycles and the ability of both on-board modules and external devices to insert breakpoints.

The background debug mode of operation involves toggling CPU 11 into a mode in which execution of normal instructions fetched via IMB 12 is halted and execution proceeds with special debugging instructions which are received by means of a serial communication interface comprising the IPIPE/DSO, IFETCH/DSI and BKPT/DSCLK pins. The special debugging instructions are capable of reading and writing the CPU's registers (including several registers not accessible in the normal mode of operation), reading and writing locations in the memory map (which includes locations in memory 14 and registers in serial interface 13, timer module 15 and SIM 16) and resuming normal instruction execution.

The ability to track the internal instruction pipeline of CPU 11 involves the use of the IPIPE/DSO and IFETCH/DSI pins. In normal mode, CPU 11 asserts IPIPE for one clock cycle when the first stage of the pipe is advanced and for two clock cycles when both stages of the pipe are advanced. Similarly, IFETCH is asserted for a single clock cycle to indicate that the current bus cycle is an instruction fetch and for two clock cycles to indicate that the pipe has been flushed.

The ability to make purely internal bus cycles on IMB 12 visible outside of microcomputer 10 involves the setting of control bits in SIM 16 to a particular value. When these bits are properly set, IMB cycles are echoed on the external bus. These external bus cycles are distinguished from normal external bus cycles by the fact that the address strobe (AS) is never asserted.

The breakpoint features of microcomputer 10 allow either an external device or one of the on-board peripherals to insert a breakpoint associated with an access of any particular memory location. Access to an operand at that location or execution of an instruction stored at that location will cause CPU 10 to execute a breakpoint exception handling routine (or to enter background debug mode).

All of these features will be explained in greater detail below.

In order to provide an adequate background for the discussion to follow, the signals of both IMB 12 and the external bus must be described. The tables below provide a summary of those signals and their definitions. Most of these signals and their definitions are similar to the bus signals of microprocessor available commercially from Motorola, Inc. of Austin, Tex. An example of such a microprocessor is the MC68010.

| INTER-MODULE BUS SIGNALS | | | |
|---|---|---|---|
| SIGNAL NAME | MNEMONIC | FUNCTION | DIRECTION |
| Address Bus | ADDR0-ADDR31 | 32 bit address bus capable of addressing 4 Gbytes | output |
| Data Bus | DATA0-DATA15 | 16 bit data bus capable of 8 and 16 bit transfers | input/output |
| Function Code | FC0-FC2 | Identifies CPU state (supervisor/user) and address space of current bus cycle | output |
| Clock | CLOCK | Master system clock | input |
| Cycle Start | CYS | Indicates start of internal bus cycle | input/output |
| Address Strobe | AS | Indicates second phase of bus cycle and that address is valid | output/input |
| Data Strobe | DS | Indicates third phase of bus cycle that data is valid for write cycle | output |
| Read/Write | WRITE | Defines a bus cycle as a read or write, relative to the bus master | output |
| Trabsfer Size | SIZ0-SIZ1 | Specifies the number of bytes yet to be transferred in a bus cycle | output/input |
| Data Transfer Acknowledge | DTACK | Slave response which terminates a bus cycle | input |
| Bus Error | BERR | Provides for termination of a bus cycle if no valid response is received | input |
| Relinquish and Retry | RRT | Provides a means for breaking a bus mastership standoff at the internal/external bus boundary | input |
| Retry | RETRY | Provides for termination of a bus cycle which should be rerun | input |
| Halt | HALT | Indicates that the CPU has halted due to an abnormal condition | output |
| Breakpoint Request | BKPT | Signals a request for a breakpoint on the current bus cycle | input |
| Breakpoint Acknowledge | FREEZE | Indicates that the CPU has entered background debug mode | output |
| System Reset | SYSRST | Provides a "soft" reset which does not disturb system configuration data | output |
| Master Reset | MSTRST | Provides a "hard" reset of everything | input |
| Interrupt Request Level | IRQ1-IRQ7 | Prioritized interrupt requests to the CPU | input |
| Autovector | AVEC | Specifies that autovector feature is to be used during an interrupt ack. cycle | input |
| Bus Request | BR0-BRn | Prioritized bus | input |

-continued

| INTER-MODULE BUS SIGNALS | | | |
|---|---|---|---|
| SIGNAL NAME | MNEMONIC | FUNCTION | DIR-ECTION |
| | | mastership arbitration | signals |
| Bus Lock | BLOCK | Allows bus master to retain bus | input/output |
| Test Mode | TSTMOD | Enables test mode for all devices | input |
| Enable IMB test lines | IMBTEST | Changes function of IRQ1-IRQ7 to test lines | input |

Note that signal directions in the table above are specified with respect to CPU 11.

| EXTERNAL BUS SIGNALS | | | |
|---|---|---|---|
| SIGNAL NAME | MNEMONIC | FUNCTION | DIR-ECTION |
| Address Bus | A0-A23* | 24 bit address bus capable of addressing 16 Mbytes | input/output |
| Data Bus | D0-D15 | 16 bit data bus capable of 8 and 16 bit transfers | input/output |
| Function Code | FC0-FC2* | Identifies CPU state (supervisor/user) and address space of current bus cycle | input/output |
| Boot Chip Select | CSBOOT | Programmable chip select for boot-up | output |
| Bus Request | BR* | Bus Mastership Request line | input/output |
| Bus Grant | BG* | Bus Mastership Grant line | output |
| Bus Grant Acknowledge | BGACK* | Bus Mastership Grant Acknowledge line | input/output |
| Data and Size Acknowledge | DSACK0-DSACK1 | Indicates that data is valid on read and that data has been received on write. Also indicates port size. | input/output |
| Address Strobe | AS | Indicates that address, function codes etc., are valid | output/input |
| Data Strobe | DS | Indicates that data is valid on write and that slave should drive data on read | input/output |
| Read/Write | WRITE | Defines a bus cycle as a read or write, relative to the bus master | input/output |
| Transfer Size | SIZ0-SIZ1 | Indicates single or multi-byte transfer | input/output |
| Bus Error | BERR | Provides for termination of a bus cycle if no valid response is received | input/output |
| Halt | HALT | Indicates that the CPU has halted due to an abnormal condition | input/output |
| Interrupt Request Level | IRQ1-IRQ7 | Prioritized interrupt requests to the CPU | input |
| Autovector | AVEC | Specifies that autovector feature is to be used during an interrupt ack. cycle | input |
| Bus Lock | BLCK | Indicates indivisible bus cycles | input/output |
| Reset | RESET | System Reset | input/output |
| External RAM Chip Enable | RAMCE | Useful to disable external devices during resets | output |
| External System Clock | CLK | External system clock - bus clock | output |
| Crystal Osc. | EXTAL, XTAL | Pins for connection of external osc. or clock circuit | input/output |
| External Filter Capacitor | XFC | Allows connection of external filter cap. to internal clock | output |
| Synthesizer VDD | VDDSYN | Provides power to internal clock synthesizer | input |
| Freeze | FRZ/QUOT | Acknowledges entry into background mode and outputs quotient bit in test mode | output |
| Test Mode Enable and Tri-State Control | TSTME/TSC | Triggers test mode and causes output drivers to be tri-stated | input |
| Clock Mode Select | MODCK | Selects source of system clock | input |

The pins denoted above with an asterisk, the address pins A19-A23, the function code pins FC0-FC2, the bus request pin BR, the bus grant pin BG and the bus grant acknowledge pin BGACK may also be used as programmable chip select pins. This feature of microcomputer 10 is not related to an understanding of the present invention. Signal directions are specified with respect to microcomputer 10.

FIG. 2 illustrates the programmer's model of CPU 11, that is, those registers which are accessible to software executing on CPU 11. CPU 11 has eight, 32-bit wide data registers, labeled D0-D7. Similarly, CPU 11 has access to seven, 32-bit wide address registers, labeled A0-A6. Each of these registers is both readable and writable while executing normal instructions.

CPU 11 has two stack pointers: a user-stack pointer labeled USP and a supervisor stack pointer labeled SSP. The stack pointers are used to point to the top of a "stack" of memory locations in which are stored information about the state of CPU 11 which is useful for returning from exception processing and the like. In addition to the labels USP and SSP, the current stack pointer may be accessed by referencing an eighth address register, labeled A7 (or A7'). Which stack pointer is accessed in this wasy is determined by the current user/supervisor state of CPU 11. The terms user and supervisor refers to the fact that CPU 11 has two "privilege states" of those names which control whether certain "privileged" instructions are executable.

The program counter of CPU 11 is a 32-bit wide register labeled PC. As is conventional, the program counter contains the address in memory at which the next instruction to be executed is stored.

The status register of CPU 11, labeled SR, inludes a separately addressable condition code register (CCR) which forms the lower byte of the status register. The lowest five bits of the status registers are the familiar carry, overflow, zero, negative and extend condition code bits, as is the case with all Motorola 68000-family microprocessors. The next three bits of the status register are unimplemented and read as zeros. Bits 8, 9 and 10 are the interrupt mask bits used by CPU 11 to determine the lowest priority interrupt which is currently unmasked. Bits 11 and 12 are unimplemented and read as zero. Bit 13 of SR is the supervisor bit, which indicates that CPU 11 is in the supervisor privilege state if it is set. The two highest order bits of the status register enable tracing of instruction execution, as in the Motorola 68020 microprocessor.

CPU 11 has two three-bit registers used in certain circumstances to determine the states of the function code outputs (FC0–FC2). These are the SFC and DFC (for source function code and destination function code) registers. These registers are used by the MOVES instruction to move data between the various address spaces of CPU 11, as is the case with the Motorola 68010 and 68020 microprocessors. As is described more fully below, SFC and DFC are also used to provide the function code outputs while in the background debug mode.

The final register appearing in the programmer's model is VBR, which stands for vector base register. VBR is used as a base for calculating vectors which are used to locate the starting addresses of exception handling software routines. This register is also present in the 68010 and 68020 microprocessors.

All of the registers described above are, in one way or another, accessible while CPU 11 is executing normal instructions. Some, such as the stack pointers and the upper half of the status register, can only be accessed while CPU 11 is in the supervisor privilege state. There are other registers, such as the temporary registers denoted by ATEMP and BTEMP, which do not appear in the programmer's model. These registers are affected by normal program execution, but are not accessible in the sense that they cannot be read or written to.

FIG. 3 is a block diagram illustrating the detailed structure of CPU 11 of FIG. 1. Of necessity, FIG. 3 is a somewhat simplified view of a very complex structure. Detailed descriptions of very similar CPU structures are to be found in U.S. Pat. Nos. 4,342,078, 4,296,469, 4,307,445 and 4,524,415. All of these patents are commonly owned with the present invention. The listed patents are hereby incorporated herein by reference.

CPU 11 is a pipelined, microprogrammed data processor. An execution unit 20 is connected bidirectionally to a data bus portion 21 of IMB 12 (see FIG. 1). Execution unit 20 is also coupled to address portion 22 of IMB 12. Execution unit 20 is coupled bidirectionally to an instruction register (IR) pipe 23, which is a multistage pipeline through which each normal instruction passes prior to and while it is actually being executed.

Execution unit 20 contains all of the arithmetic, shift, register and other logic necessary to execute each of the normal and special debug instructions of CPU 11. Except for the destination function code and source function code registers and the status register, all of the registers described above with reference to FIG. 2 may be thought of as residing within execution unit 20.

Outputs of IR pipe 23 are coupled to inputs of an address 1 decoder 25, an address 2/2R/3 decoder 26, an address 4 decoder 27, an illegal instruction decoder 28, branch controller 29 and a general internal (G) bus 30. Address decoders 25, 26 and 27 operate on portions of instructions to produce a next micro address. Branch controller 29 produces a portion of a next micro address. Illegal instruction decoder 28 also produces a next micro address. Each of these next micro addresses, or portions thereof, is input to a multiplexor 32. Multiplexor 32 also receives inputs from an exception priority decoder 33 and a micro ROM 34. The output of multiplexor 32 is input to a micro address register 35.

Micro address register 35 contains the micro address of the micro instruction currently being executed. Micro address register 35 provides outputs to both micro ROM 34 and to nano ROM 36. In combination, micro ROM 34 and nano ROM 36 produce the control outputs necessary to execute each instruction and to proceed to the next instruction. An output of micro ROM 34 is coupled to bus controller 40, which operates IMB 12 as a bus master to fetch normal instructions and to read and write data.

Another output of micro ROM 34 is coupled to function code logic 41, which also receives inputs from destination function code register 42 and source function code register 43. Function code logic 41 produces the function code bits which indicate the address space of each IMB bus cycle. DFC 42 and SFC 43 are also bidirectionally coupled to G bus 30.

Various outputs of nano ROM 36 are coupled to background mode serial logic 45, bus controller register control logic 46, general register control logic 47 and condition code and ALU (arithmetic and logic unit) control logic 48. General register control logic 47 also receives inputs from G bus 30. Background mode serial logic 45 is bidirectionally coupled to G bus 30. Bus controller register control 46 and general register control 47 provide outputs to execution unit 20. Condition code and ALU control logic 48 is bidirectionally coupled to execution unit 20 and has an output coupled to branch control 29. Status register 49 is bidirectionally coupled to G-bus 30, receives inputs from condition code and ALU control logic 48 and provides outputs to branch control logic 29. G bus 30 provides inputs to execution unit 20.

While executing normal instructions, CPU 11 operates in a fashion substantially similar to the data processors described in the above-referenced U.S. Patents. Instructions are fetched from memory through the operation of bus controller 40, passed through IR pipe 23 and executed by execution unit 20. When toggled into the background debug mode however, normal instruction execution is halted. Debug instructions received by means of background mode serial logic 45 are passed through IR pipe 23 and executed. Since the same instruction execution apparatus is used in both the normal and background modes, very little additional hardware is required to implement the background debug mode. Relatively small additions to one or more of address decoders 25, 26 and 27 and to micro ROM 34 and nano ROM 36 are required, in addition to background mode serial logic 45 itself.

Figure 4:
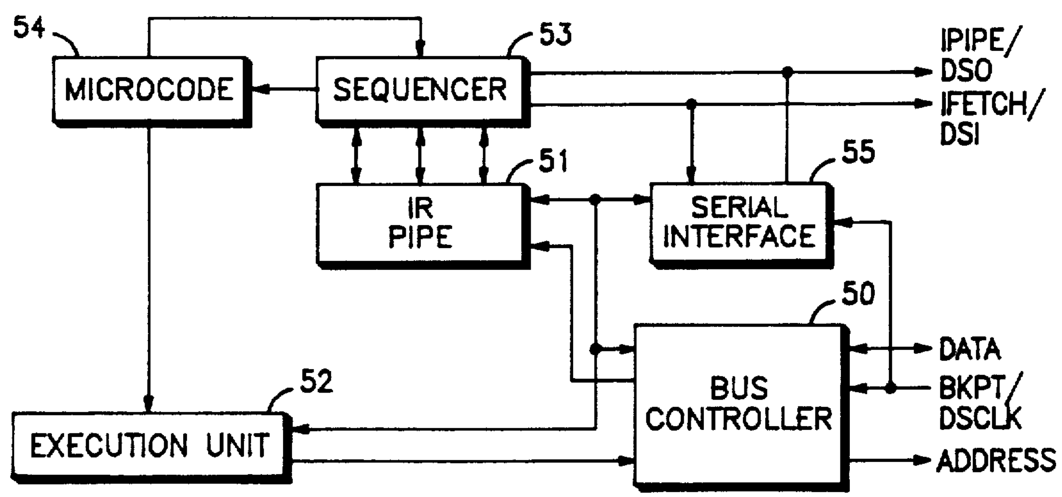
FIG. 4 is a block diagram illustrating a debug mode serial interface portion of the apparatus of FIG. 3.

FIG. 4 illustrates in greater detail the logical relationships between the major components of CPU 11 as they relate to the subject matter of the present invention. In the normal mode of operation, a bus controller 50 fetches instructions and data operands from memory by means of a data bus and an address bus (which are merely the data and address portions of IMB 12 of FIG. 1), which are operated by bus controller 50 as a bus master. Instructions are passed from bus controller 50 to IR pipe 51 and data operands are passed to an execution unit 52. Various outputs from the multiple stages of IR pipe 51 are provided to a sequencer 53, which provides inputs to microcode 54. Microcode 54 also provides inputs to sequencer 53. The outputs of microcode 54 provide inputs to control the operation of execution unit 52. As is apparent, this description is a somewhat more simplified view of the operation of a pipelined, microcoded processor than was presented above.

Sequencer 53 controls the advancement of instructions through the stages of IR pipe 51. It provides the output signals IPIPE and IFETCH so that an external development system can continuously monitor the contents of IR pipe 51. In the preferred embodiment, IR pipe 51 may be considered to be a three stage pipe. Sequencer 53 asserts IPIPE for one clock cycle when the first stage of the pipe is advanced to the second stage. Sequencer 53 asserts IPIPE for two clock cycles when both the first stage is advanced to the second stage and the second stage is advanced to the third stage. IFETCH is asserted for one clock cycle when the current bus cycle is an instruction fetch (i.e., when the results of the bus cycle will be loaded into IR pipe 51). IFETCH is asserted for two clock cycles when IR pipe 51 is cleared, or, as is commonly said, flushed. This occurs, for instance, when a program branch is taken or exception processing is commenced. The assertion of IFETCH for two cycles also indicates that the data returned on the current bus cycle will be the first word loaded into the newly cleared IR pipe 51.

A BKPT input to bus controller 50 includes both the BKPT signal line of IMB 12 and the direct BKPT input to CPU 11 as shown in FIG. 1. Any device having access to BKPT may monitor the bus cycles on IMB 12 and/or the external bus and insert breakpoints whenever the address being accesed falls within some preselected range, or at any other time deemed appropriate. If the bus cycle on which the BKPT input to bus controller 50 is asserted is not an instruction fetch cycle, the breakpoint will be acknowledged immediately upon the completion of the execution of the currently executing instruction. If the cycle is an instruction fetch, then the breakpoint will be made "pending" and only acknowledged after the instruction fetched on that cycle is eventually executed.

Insertion of a breakpoint by means of either the IMB BKPT line or the external BKPT line is referred to as a "hardware" breakpoint. In addition to a hardware breakpoint, a "software" breakpoint is provided in the preferred embodiment. The software breakpoint is substantially the same as the software breakpoint provided on the Motorola 68020 microprocessor and simply comprises one or more of the normal instructions which are responded to as breakpoint instructions.

Upon either a hardware or a software breakpoint, a special bus cycle referred to as a breakpoint acknowledge cycle is executed. This bus cycle is terminated by the receipt of either a BERR signal or a data transfer and size acknowledge signal on DSACKO-1. On both hardware and software breakpoints, termination of the cycle by BERR causes CPU 11 to proceed with exception processing. An illegal instruction exception is taken in the case of a software breakpoint and a breakpoint exception is taken in the case of a hardware breakpoint. If a breakpoint acknowledge cycle initiated by a software breakpoint is terminated by the receipt of a data transfer and size acknowledge on the DSACKO-1 lines, the returned data is used to replace the breakpoint instruction and execution resumes with the replacement instruction. If a breakpoint acknowledge cycle initiated by a hardware breakpoint is terminated by receipt of a data transfer and size acknowledge on DSACKO-1, the returned data is ignored and execution is resumed with the next instruction as if the breakpoint were never received. Hardware breakpoints also comprise one of several methods of entering the background debug mode, if it is enabled.

Three different methods for entry into the background debug mode are provided in the preferred embodiment. However, none of the entry methods is successful unless the background debug mode is enabled. Enablement of the background debug mode is determined when microcomputer 10 is reset by means of the external RESET signal. When microcomputer 10 exits reset, the state of the external BKPT pin is latched. If the latched value of BKPT is a logical zero, then background debug mode entry is enabled. Otherwise, entry is disabled. The state of enablement of background debug mode entry is not alterable unless microcomputer 10 is reset again.

Assuming that background debug mode entry is enabled, the mode may be entered by assertion of the BKPT input to bus controller 50, either by one of the devices connected to IMB 12 or by an external device via the external BKPT pin, by execution of the background instruction which is provided as one of the normal instructions, or by double bus faults (i.e., a second bus fault occuring during the processing of an exception caused by a first bus fault).

The action of the various breakpoint and background debug mode entry methods is summarized in the following table.

| | RESPONSE | |
|---|---|---|
| EVENT | BGM ENABLED | DISABLED |
| double bus fault | background mode | halt |
| hardware breakpoint | background mode | breakpoint ack |
| software breakpoint | breakpoint ack | breakpoint ack |
| background instr. | background mode | illegal exc. |

The background debug mode of operation of the apparatus of FIG. 4 involves the termination of normal program execution. Once debug mode is entered, interrupts to CPU 11 are not acknowledged or acted upon and instruction tracing is disabled. Debug instructions and any address and/or operand data required for the execution thereof are provided to IR pipe 51 by serial interface 55. Serial interface 55 receives these instructions and data from an external development system via the DSI pin and simultaneously passes status and result data to the development system via the DSO pin. Serial interface 55 operates in a manner similar to the familiar Motorola Serial Peripheral Interface in which one bit of data is shifted in and one bit of data is shifted out on each cycle of the clock signal DSCLK. Since DSCLK is provided by the external development system, it controls the serial interface and is said to be the master thereof. Serial interface 55 operates as a slave.

The choice to operate serial interface 55 as a slave when in the background debug mode is a feature of the preferred embodiment of the present invention. This choice provides a greater degree of freedom in the implementation of a development system designed for use with this invention, since the development system is not constrained by the clock rate at which CPU 11 is operating when in its normal mode.

Upon the occurence of one of the background debug mode entry events, the IMB FREEZE signal is asserted to indicate background debug mode entry to other devices on IMB 12. The external bus FREEZE signal is also asserted. No context stacking is performed for entry into background debug mode. Normal instruction execution is halted and serial interface 55 is enabled.

Appropriate response to FREEZE by peripheral devices provides for entry into, and recovery from, background debug mode without apparent loss of "real time" context. For instance, a watchdog timer which might form a part of SIM 16, could be configured to generate an interrupt or reset periodically if it is not cleared before it times out. Obviously, if such a timer is turned off by disabling its clock in response to FREEZE, normal instruction execution could begin without losing the state of the watchdog timer as it appeared prior to background debug mode entry. The most appropriate response to FREEZE must be determined on an individual basis for each component of a system.

An external development system which is to interact with CPU 11 during background debug mode must, of course, monitor the FREEZE line of the external bus. When FREEZE is asserted, the external development system will release BKPT (if it asserted BKPT) and commence transferring debug instructions and data.

Once it has been placed in background debug mode, CPU 11 simply waits for a debug instruction to be supplied by an external development system by means of serial interface 55. A single "transfer" of information via serial interface 55 comprises 17 bits: 16 bits of instruction, operand or response and one bit of status information. Note that 17 bits are transferred in each direction; that is, from serial interface 55 to the external development system and from the external development system to serial interface 55.

Obviously, the first transfer after entry into background debug mode comprises a debug instruction to be executed. Subsequent transfers may involve the provision of operands such as addresses and data necessary for debug instruction execution and/or the provision of results of debug instruction execution to the external development system.

Once a complete debug instruction, and any necessary address or data is shifted into serial interface 55, the instruction is executed. In the preferred embodiment, serial interface 55 passes instructions to be executed through a stage of IR pipe 51 which is always empty upon background debug mode entry. This is possible since such mode entry occurs only on instruction boundaries.

As mentioned above, the 17 bits received by the external development system on each transfer are intended to be interpreted as 16 bits of data and one status bit (the most significant bit). If the status bit is 0, then the data is to be interpreted as a valid transfer of the results of the excecution of the previous debug instruction. If the status bit is 1 and the data bits are all 0, the development system is to infer that CPU 11 is not yet ready to respond to the previous debug instruction. If the status bit is 1 and the least significant four data bits are also 1, then the previously transferred debug command was either an illegal command or was not received properly. If the status bits and all of the data bits are 1, then execution of the debug instruction was terminated by a bus error. The development system may re-synchronize the serial interface by transferring 17 or more consecutive 1's. Except when re-synchronizing, the external development system must set the most significant bit of data transferred into serial interface 55 to zero.

Commands in the set of debug instructions include: 1) read an address or data register, 2) write an address or data register, 3) read a system register, 4) write a system register, 5) read a memory location, 6) write a memory location, 7) dump a memory block, 8) fill a memory block, 9) flush the instruction pipe and resume normal execution, 10) assert the SYSRST line of IMB 12 to reset peripherals and 11) perform a no-operation (NOP).

In the case of register instructions, the source or destination register is specified by an encoded bit field of the instruction itself. All address and data registers of the programmer's model are accessible. In addition, all of the system registers of the programmer's model are accessible (including PC, SR, USP, SSP, SFC, DFC and VBR). In addition, the ATEMP and BTEMP registers which do not appear in the programmer's model are accesible via the read system register and write system register debug instructions. Of course, any other registers which do not appear in the programmer's model could also be made accessible to debugging instructions, if desired. On register writes, the 32 bits comprising the two transfers immediately following the instruction supply the data to be written.

In the case of memory reads and writes, the address is specified by 32 bits of address supplied by the two transfers immediately following the instruction. For writes, the byte, word or long word to be written is supplied by the one or two transfers following the address. For memory reads, the SFC register supplies the function codes to be used; that is, the bits of SFC determine the address space to be accessed. Similarly, for memory writes, the DFC register supplies the function codes to be used. This implies that SFC and DFC must be properly set up using the write system register commands before using the memory read and write commands.

The memory block read and write instructions are used when more than a single operand from memory is to be accessed. Either instruction must be preceded by a read or write memory instruction in order to set the starting address for the block operation. Once the starting address has been set, subsequent block reads and writes need only supply the operand size and the operand itself on writes.

Note that the ability to perform memory reads and writes implies that IMB 12, the external bus interface and the other on-chip peripherals must still be active in the background debug mode of operation. That is, they do not respond to the FREEZE signal by halting operation. FREEZE is provided primarily to allow subsystems such as watchdog timers, periodic interrupt generators and the like to respond in an appropriate manner to maintain the context of the machine as may be desired upon resumption of normal instruction execution, as mentioned above.

Other possible debug mode instructions which may be useful include an instruction to restart normal instruction execution without flushing the instruction pipe and an instruction to return information about the particular version of microcomputer 10 being used, such as a microcode revision number. It should be noted that the read and write memory commands can be used to access memory-mapped registers which control the on-chip peripherals of microcomputer 10. For instance, a register within SIM 16 contains a two bit field which controls the external visibility of bus cycles of IMB 12. These bits are readable and writable in the background debug mode.

As is apparent from the descriptions above, a data processor with powerful development support features has been disclosed. The processor has an alternate mode of operation in which an alternate, externally-controlled path is utilized to provide instructions to the processor. The connections used for this alternate path are used in the normal mode of operation only for other development support features, so that no user-accessible system resources are appropriated. The instructions supplied to the processor in the alternate mode of operation are executed by the normal instruction execution apparatus, so as to minimize the additional hardware required to implement the development support features.

We claim:

1. A data processor having first and second modes of operation for use in a data processing system comprising:

means for operating a parallel communication bus;

means for operating a serial communication bus, said serial communication bus is coupled to said data processor by means of a plurality of pins, each of said plurality of pins is either not used or is used only for development support functions while said data processor is in said first mode;

the data processor comprising:

means for sequentially executing, while in said first mode, a first plurality of instructions fetched from a memory by means of said parallel communication bus while in said first mode;

means for sequentially executing, while in said second mode, a second plurality of instructions received by means of said serial communication bus while in said second mode, said means for executing a second plurality of instructions further comprising means for accessing said memory by means of said parallel communication bus while in said second mode; and mode switch means for switching between said first and second modes and for disabling said means for operating a serial communications bus while said data processor is in said first mode.

2. A data processor according to claim 1 wherein said means for sequentially executing said first plurality of instructions and said means for sequentially executing said second plurality of instructions comprise:

a single micro-machine.

3. A data processor according to claim 1 further comprising:

said mode switch means is responsive to an externally-provided signal to switch from said first mode of operation to said second mode of operation; and control means for disabling said mode switch means from switching to said second mode of operation.

4. A data processor according to claim 1 further comprising:

said mode switch means is responsive to at least one of said second plurality of instructions to switch from said second mode of operation to said first mode of operation; and control means for disabling said mode switch means from switching to said second mode of operation.

5. A data processor according to claim 1 further comprising:

said mode switch means is responsive to an error condition to switch from said first mode of operation to said second mode of operation; and control means for disabling said mode switch means from switching to said second mode of operation.

6. A data processor according to claim 5 wherein said error condition comprises:

two consecutive bus errors of said parallel communication bus.

7. A data processor according to claim 1 further comprising:

said mode switch means is responsive to at least one of said first plurality of instructions to switch from said first mode of operation to said second mode of operation; and control means for disabling said mode switch means from switching to said second mode of operation.

8. A data processor for executing each of a plurality of instructions, the data processor having a plurality of system resources and comprising:

first means for executing said instructions;

second means for utilizing the system resources in accordance with the execution by said first means of a first subset of said instructions;

third means for providing access to at least one of the system resources in accordance with the execution by said first means of a second subset of said instructions;

first communication means for providing instructions of said first subset to said first means, said first communication means is operative for communication in response to instructions of both said first and second subsets of instructions;

second communication means distinct from said first communication means for providing instructions of said second subset to said first means, said second communication means is not operative for communication of instructions of said second subset in response to any instructions of said first subset of instructions; and fourth means coupled to said first means and to said second communication means for using said second communication means to indicate a status of said first means while said first means is executing instructions of said first subset.

9. A data processing system according to claim 8 further comprising:

mode switch means for switching between said first and second subsets of said instructions, said mode switch means being responsive to at least one of said instructions of said second subset to switch from said second subset to said first subset; and control means for disabling said mode switch means from switching to said second subset of said instructions.

10. A data processing system according to claim 8 further comprising:

mode switch means for switching between said first and second subsets of said instructions, said mode switch means being responsive to an externally-provided signal to switch from said first subset to said second subset; and control means for disabling said mode switch means from switching to said second subset of said instructions.

11. A data processing system according to claim 8 further comprising:

mode switch means for switching between said first and second subsets of said instructions, said mode switch means being responsive to at least one of said instructions of said first subset to switch from said first subset to said second subset; and control means for disabling said mode switch means from switching to said second subset of said instructions.

12. A data processing system according to claim 8 further comprising:

mode switch means for switching between said first and second subsets of said instructions, said mode switch means being responsive to an error condition to switch from said first subset to said second subset; and control means for disabling said mode switch means from switching to said second subset of said instructions.

13. A data processor comprising:

execution means for sequentially executing a plurality of instructions, said execution means having a first mode in which instructions of a first subset are executed and a second mode in which instructions of a second subset are executed;

communication means for providing said plurality of instructions to said execution means, said communication means operating in a master mode while providing instructions of said first subset and in a slave mode while providing instructions of said second subset, said communication means is coupled to a first plurality of pins and to a second plurality of pins, said communication means uses the first plurality of pins while providing instructions of the first subset and uses the second plurality of pins while providing instructions of the second subset, each of the second plurality of pins is either not used or is used only for development support functions while the communication means is providing instructions of the first subset;

mode switch means for switching between said first mode and said second mode and for preventing said communication means from operating in said slave mode while said execution means is executing instructions of said first subset.

14. A data processor according to claim 13 wherein said communication means further comprises:

controller means for operating a parallel communication bus as a bus master; and a slave-only serial communication interface.

15. A data processor according to claim 13 wherein:

said mode switch means is responsive to the execution of an instruction of said first subset to switch from said first subset to said second subset.

16. A data processor according to claim 13 wherein:

said mode switch means is responsive to the execution of an instruction of said second subset to switch from said second subset to said first subset.

17. A data processor according to claim 13 wherein:

said mode switch means is responsive to an externally-provided signal to switch from said first mode to said second mode.

18. A data processor according to claim 13 wherein:

said mode switch means is responsive to an error condition to switch from said first mode to said second mode.

19. A data processor according to claim 18 wherein said error condition comprises:

two consecutive errors of said communication means.

20. A data processor according to claim 13 further comprising:

control means for disabling said mode switch means from switching to said second mode of operation.

21. A data processor according to claim 13 wherein said execution means further comprises:

a plurality of registers, at least one of said registers being inaccessible by said execution means while in said first mode and being accessible by said execution means while in said second mode.

22. An integrated circuit data processor comprising: execution means for sequentially executing a plurality of instructions first communication means for operating a first communication bus as a bus master to provide a first subset of said plurality of instructions to said execution means;

second communication means for operating a second communication bus as a bus slave to provide a second subset of said plurality of instructions to said execution means; and mode switch means for switching said execution means between said first and second subsets of said plurality of instructions and for enabling said second communication means only while said execution means is executing instructions of said second subset;

wherein said second communication bus is coupled to said data processor by means of a plurality of pins, said plurality of pins are either not used or are used only for development support functions while said data processor is executing instructions of said second subset.

23. An integrated circuit data processor according to claim 22 wherein:

said first communication means is operative in response to the execution by said execution means of instructions of both said first and second subsets.

24. An integrated circuit data processor according to claim 22 further comprising a plurality of pins for interconnection of the data processor with external devices and wherein:

said first communication means utilizes a first subset of said plurality of pins;

said second communication means utilizes a second subset of said plurality of pins, said second subset of said plurality of pins being inaccessible to said execution means for providing said second subset of said plurality of instructions to said execution means while executing instructions of said first subset.

25. An integrated circuit data processor according to claim 24 wherein:

said execution means further comprises an instruction pipe; and at least one of said second subset of said plurality of pins is used while said execution means is executing instructions of said first subset to provide an output indicating an activity of said instruction pipe.

26. An integrated circuit data processor according to claim 25 wherein:

a first one of said second subset of said plurality of pins is used while said execution means is executing instructions of said first subset to provide an output indicating an advancement of said instruction pipe; and a second one of said second subset of said plurality of pins is used while said execution means is executing instructions of said first subset to provide an output indicating that a current operation of said first communication means is an instruction fetch operation.

27. An integrated circuit data processor comprising:

a central processing unit, the central processing unit further comprising:

program counter means for storing an address;

execution means for executing a first plurality of instructions while in a first operating mode, for executing a second plurality of instructions while in a second operating mode, for producing instruction prefetch requests, for determining a sequence of instruction execution and for storing addresses in the program counter means in accordance with the sequence; and bus controller means for coupling the central processing unit to a parallel communication bus and for operating the parallel communication bus as a bus master, in response to one of the instruction prefetch requests from the execution means, to obtain one of said first plurality of instructions from a location in a memory specified by the address stored in the program counter means; and a plurality of resources under control of the central processing unit for performing a predetermined plurality of functions while in the first operating mode, the predetermined plurality of functions comprises substantially all of the functions which the data processor is capable of performing;

wherein the improvement comprises:

a serial communication bus means coupled to the execution means for providing one of said second plurality of instructions to the execution means under control of an external serial bus master, the serial communication bus is not operative for serial communication while in the first operating mode;

the execution means ceases to produce the instruction prefetch requests while in the second operating mode, ceases to determine the sequence of instruction execution while in the second operating mode and ceases to store addresses in the program counter means in accordance with the sequence while in the second operating mode; and the plurality of resources performs each of said predetermined plurality of functions while in the second operating mode.

28. An integrated circuit data processor according to claim 27 wherein:

the serial communication bus means is operative while in the first mode of operation to provide an output indicating a current activity of the central processing unit.

29. An integrated circuit data processor according to claim 27 wherein:

the central processing unit further comprises:

instruction pipe means under control of the execution means for storing instructions obtained by the bus controller means while in the first mode of operation and instructions provided by the serial communication bus means while in the second mode of operation; and the serial communication bus means is operative in while in the first mode of operation to provide an output indicating an activity of the instruction pipe means.

30. An integrated circuit data processor according to claim 29 wherein:

the serial communication bus means is operative while in the first mode of operation to provide a first output indicating an advancement of the instruction pipe means and to provide a second output to indicate that a current operation of the parallel communication bus is an instruction prefetch.

* * * * *

UNITED STATES PATENT AND TRADEMARK OFFICE

CERTIFICATE OF CORRECTION

PATENT NO. : 5,084,814

DATED : Jan. 28, 1992

INVENTOR(S) : John J. Vaglica, et al.

It is certified that error appears in the above-identified patent and that said Letters Patent is hereby corrected as shown below:

Column 13, line 41, change "communications" to --communication--.

Column 18, line 26, after "operative" delete [in].

Signed and Sealed this

Ninth Day of November, 1993

*Attest:*

BRUCE LEHMAN

*Attesting Officer*

*Commissioner of Patents and Trademarks*